March 4, 1969     G. W. METZGER     3,430,936
HEAT EXCHANGE STRUCTURE FOR ROTARY KILNS Filed May 23, 1967     Sheet _1_ of 2

INVENTOR
GRANT W. METZGER

BY *Finnegan & Henderson*

ATTORNEYS

March 4, 1969  G. W. METZGER  3,430,936

HEAT EXCHANGE STRUCTURE FOR ROTARY KILNS

Filed May 23, 1967  Sheet 2 of 2

INVENTOR
GRANT W. METZGER

BY *Finnegan & Henderson*

ATTORNEYS

United States Patent Office 3,430,936
Patented Mar. 4, 1969

3,430,936
HEAT EXCHANGE STRUCTURE FOR ROTARY KILNS
Grant W. Metzger, Menlo Park, Calif., assignor to The Flintkote Company, New York, N.Y., a corporation of Massachusetts
Filed May 23, 1967, Ser. No. 640,709
U.S. Cl. 263—33          8 Claims
Int. Cl. F27b 7/04

ABSTRACT OF THE DISCLOSURE

A rotary kiln for heat treatment of pulverulent materials, such as Portland cement raw materials. The kiln is a refractory-lined cylindrical metal shell with an internal heat exchange structure composed of a central opening and a series of circumferentially-arranged relatively thin metal-walled compartments. The compartments carry the material through the kiln and are made up of readily detachable and replaceable modular metal units. In operation, the kiln rotates on an inclined axis, and the material to be heated passes through the compartments from the upper inlet end to the discharge end of the shell. A stream of hot gases, from the combustion of fuel is delivered to the discharge end of the kiln and is passed through the compartments and the central opening of the heat exchange structure in countercurrent flow to the material.

---

This invention relates to rotary kilns for heat treatment of pulverulent materials and more particularly to heat exchange structure for an inclined rotary kiln used in the burning of cement clinker, magnesite, lime, or the like.

In conventional rotary kilns for drying or heat treating granular or powdered materials, such as the burning of Portland cement clinker, a heat exchange is caused to occur between a moving mass of the divided material to be heated and a countercurrent flowing stream of hot combustion gases. Such a kiln is typically cylindrical, lined with a suitable refractory material, and rotatably mounted on an inclined axis.

The material to be heated is fed to the upper end of the cylindrical kiln and progresses down the kiln by moving with the inner surface of the kiln as it rotates until the angle of repose of the material is exceeded. When the angle is exceeded, the material spills over, and slides back toward the bottom of the kiln. At the same time the material slides downward by gravity toward the lower end of the kiln because of the inclination of the rotating kiln.

The transfer of heat to the material in a typical rotary kiln, however, is very inefficient. This inefficiency results primarily from a poor exchange of heat between the hot combustion gases and the relatively cold materials in the kiln. Because the material lies as a mass in the bottom portion of the cylindrical kiln, only the top surface of the mass is exposed to the flow of hot gases. Additionally, heat is transferred to the material immediately adjacent the hot inner walls of the kiln, but the majority of the material within the interior portions of the mass receives very little heat.

Moreover, as the kiln rotates, the material tends to slide as a whole around the inner surface of the kiln before the angle of repose of the material is exceeded. This prevents the material from spilling over and mixing with exposure of additional material in the interior of the mass to the heat transfer mediums. The shape of the mass of material thus remains substantially the same in its passage through the kiln and very little of the interior portion of the mass receives heat from the heat transfer mediums, since the material itself is a poor conductor of heat.

Many devices have been employed in the past to improve the efficiency of heat transfer in rotary kilns. These devices include such structures as chains, crosses, plows, recouperators, and similar devices disposed about the inner peripheral surface of the kiln or hanging in the kiln within the path of the moving material. The purpose of these structures is to agitate or otherwise separate the material to increase the amount of material exposed to the hot gases, to the heated internal surfaces of the kiln, and to the heated structures themselves, thereby improving the thermal efficiency of the kiln. These devices also include structures that drop the material through the stream of hot gases to increase the exposure of the material and improve the thermal efficiency of the kiln.

While these structures increase thermal efficiency, they decrease production efficiency, since agitating the material and dropping the material through the gas stream creates dust which is picked up or entrained in the hot combustion gas and carried out of the kiln by the exiting gases. This circumstance may result in a severe loss of material to the atmosphere and require the use of a system for collecting the dust entrained in the exiting gases.

Other types of heat exchange structures have also been developed in attempts to increase the thermal and production efficiencies of rotary kilns. An advantageous heat exchange structure for a rotary kiln provides a plurality of circumferentially spaced chambers within the kiln by which the material to be heated is subdivided into a plurality of individual streams and deposited against the kiln lining. When the material is divided into many smaller masses, more of it is exposed to the hot gases and the heated surfaces of the kiln, than in a conventional single chamber rotary kiln.

A typical segmented kiln, for example, has a plurality of inner partitions, comprising a continuation of the refractory lining of the kiln, which divide the kiln into radical segments extending along its length. Each segment constitutes a separate compartment or individual kiln of angled configuration that rotates about the kiln axis. The segmented compartments divide the total material into a plurality of smaller streams so that more surface area of material is exposed to the hot combustion gases and to heated internal surfaces of the kiln including the heated surfaces of the partitions themselves. The angled corners of the compartments also help to expose more of the material to the heated surfaces by causing a gentle mixing action of the material instead of allowing it to merely slide around the inside surfaces of each compartment as the kiln rotates.

Because of the increased exposure of material to heat transfer mediums, a segmented heat exchange structure provides an increase in thermal efficiency of the kiln. It also achieves this increase in efficiency without a sacrificial increase in entrainment of material in the hot gases by keeping the material against the kiln lining.

The shell of a rotary kiln, while cylindrical, actually assumes an elliptical shape under its own weight and the weight of its lining, since it is supported for rotation at the bottom portions of the kiln shell. The elliptical cross-sectional shape of the kiln, therefore, continuously changes with respect to the kiln shell as the kiln rotates causing the kiln to flex and bend.

Refractory brick partitions which are interconnected with and form continuations of the kiln lining in a segmented heat exchange structure tend to crack or break, because of their inherent rigidity, under the stresses caused by this flexing and bending of the kiln as it rotates. It is accordingly desirable to provide a segmented heat exchange structure having metal partitions that can bend and give and that, as opposed to refractory partitions, will not be damaged by flexure of the kiln as it rotates. Moreover, the highly heat-conductive metal partitions provide even greaater heat transfer than refractory materials and permit a greater thermal efficiency to be achieved in the kiln.

Metal heat exchange structures have not been used in practice, however, because such structures have proven uneconomical to construct, operate, and repair, even though they have some decided operating advantages over heat exchange structures of refractory materials. The high temperatures and acidic nature of combustion gases, for example, have a deleterious effect on metal partitions that requires provision for cooling passages within the heat exchange structure to cool the partitions and prolong their life. Eventually, even with cooling, however, the metal partitions become corroded and replacement is required. The metal partitions also have to be formed in special shapes to fit the kiln interior, and it is difficult and time-consuming to assemble them along with the necessary cooling ducts.

Such heat exchange structures are thus of a semi-permanent nature and it is impossible to remove or repair them with care after they have become corroded and damaged through exposure to the hot, acidic combustion gases used to heat the material. Once such a heat exchange structure needs replacement, it must be completely dismantled, removed from the kiln, and replaced with a new structure. Because of the great expense involved in the installation, operation, and replacement of such structures, it has not been economically feasible to use metal heat exchange structures for rotary kilns, even though they provide a significant increase in the operating and thermal efficiencies of the kiln.

Accordingly, it is the primary object of this invention to provide a new and improved metal heat exchange structure for rotary kilns that overcomes the disadvantages, without sacrificing the merits, of prior structures previously available.

Another object of this invention is to provide a new and improved compartmented heat exchange structure for rotary kilns that is easy to assemble and install in kilns and easy to replace when repair is needed.

A further object of this invention is to provide a metal heat exchange structure for rotary kilns that is constructed of easily interconnectable modular units which are readily attachable to the kiln.

Still another object of this invention is to provide a compartmented metal heat exchange structure for rotary kilns that is constructed of a small number of standardized and interchangeable units that can be easily and individually replaced, if damaged, without the need to disassemble and remove the entire heat exchange structure from the kiln.

Yet another object of this invention is to provide a new and improved compartmented metal heat exchange structure for rotary kilns that increases the thermal and production efficiencies of kilns and eliminates the need for cooling ducts to cool the metal partition members of the structure.

A further object of this invention is to provide an improved heat exchange structure that increases the thermal efficiency of rotary kilns. The structure comprises a plurality of peripherally spaced heating chambers separated by relatively thin metal heat-conductive partitions and spaced about a central chamber exposed to the flow of hot gases to increase the thermal efficiency of the kiln.

A still further object of this invention is to provide an improved heat exchange structure for rotary kilns that offers substantially no resistance to the flow of hot gases, increases the thermal efficiency of kilns, is lighter in construction than conventional kilns, and flexes with the kiln as it rotates to prevent undue damage to the internal lining.

Additional objects and advantages of this invention will be set forth in part in the description which follows and in part will be obvious from the description or may be learned by practice of the invention, these objects and advantages being realized and attained by means of the instrumentalities and combinations particularly pointed out in the appended claims.

To achieve the foregoing objects and in accordance with its purpose, this invention, as embodied and broadly described, comprises in a rotary kiln for heating pulverulent material, a cylindrical metal shell rotating on an inclined axis having an upper inlet end and a lower discharge end and a heat exchange structure to carry and heat pulverulent material as it passes through the shell. In accordance with the invention, the shell of the rotary kiln has a refractory lining and includes an internal heat exchange structure comprising a plurality of thin metal heat-conductive radial webs detachably secured to and extending inwardly from the shell a distance less than the radius of the cylindrical shell, said webs extending lengthwise at least along a portion of the length of the shell, a plurality of thin metal heat-conductive longitudinal webs detachably interconnected with the inner ends of the radial webs and extending lengthwise along at least said portion of the shell, said radial and longitudinal webs forming a plurality of peripherally spaced compartments about a central opening. Deflectors are also provided across a portion of the discharge end of each compartment readily attachable to the webs to prevent the material from falling across the flow of hot gases as the material is discharged from the heat exchange structure.

The accompanying drawings which are incorporated in and constitute a part of this specification illustrate one embodiment of the invention and, together with the description herein, serve to explain the principles of the invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

Figure 1:
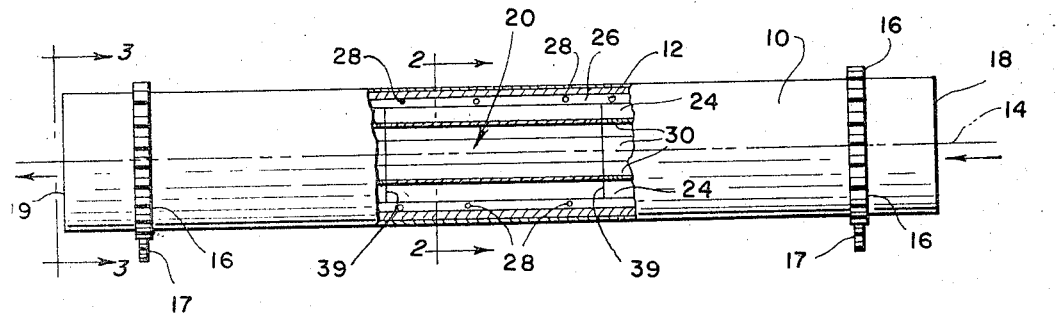
FIG. 1 is a side elevation of a rotary kiln partially broken away to show the heat exchange structure of this invention and its relationship to the kiln.

As shown in FIG. 1, a rotary kiln is provided comprising a generally elongated, cylindrical metal shell or casing 10 and having a lining of refractory material 12, such as refractory brick. The kiln is mounted on an inclined axis 14 and adapted to be rotatably driven by any suitable means as is well known to those skilled in the art, such as by ring gears 16 operatively engaged by motor driven pinion gears 17. Pulverulent material, and more particularly blends of calcareous and argillaceous minerals suitable for the production of Portland cement clinker, fed to the upper end 18 of cylinder 10, flows down through the kiln due to the force of gravity and the inclination of the kiln, and exits at the lower or discharge end 19.

In the manufacture of cement clinker, the pulverized raw material is progressively dried, heated, calcined, and burned as it passes through the kiln. The necessary heat to achieve this is conventionally supplied to the kiln by hot combustion gases delivered to lower end 19 of the kiln. These gases flow upwardly in countercurrent flow to the material flowing down through the kiln. As the material moves from the high feed end to the low discharge end of the kiln, heat is transferred to the material by radiation from the hot gases and by conduction from the heated surfaces of the kiln.

Figure 2:
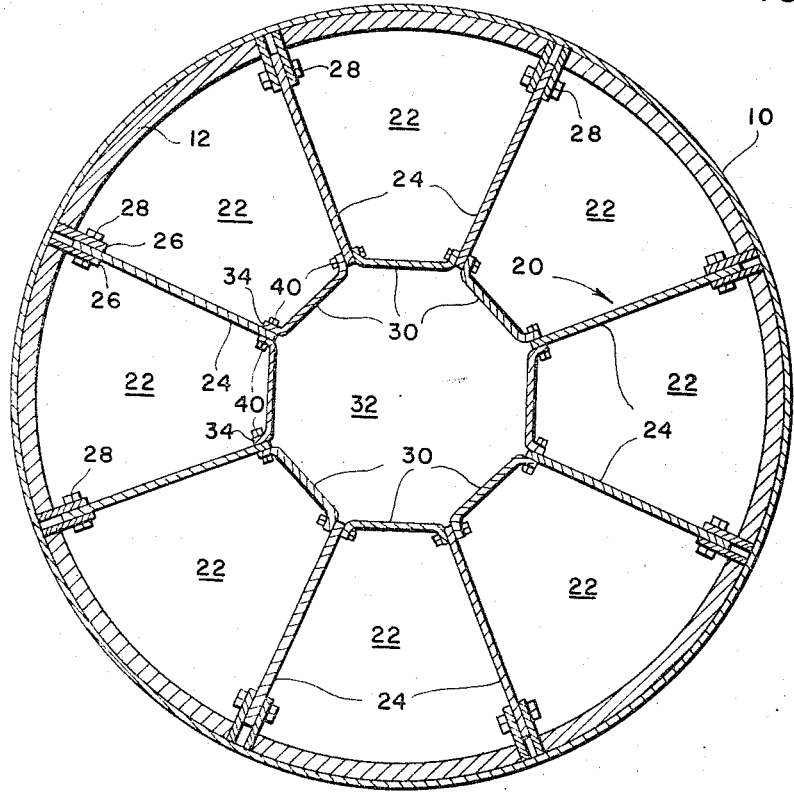
FIG. 2 is an enlarged sectional view taken along the line 2—2 of FIG. 1.

In accordance with the invention, an improved and economically feasible compartmented heat exchange structure, generally indicated at 20, is provided to increase the thermal efficiency without sacrificing its production efficiency. This novel heat exchange structure, as more clearly shown in FIG. 2, provides a plurality of compartments 22 peripherally spaced around the inner circumference of kiln shell 10 extending longitudinally along at least a portion of the length of the kiln.

As embodied, this improved structure is constructed from a plurality of relatively thin metal and heat-conductive modular units. These units consists of spaced radial webs 24 extending inwardly from the walls of the kiln and at least along a portion of the length of the cylinder. Heat-conductive webs 24 may be of stainless steel or other high temperature alloys resistant to corrosion by the hot combustion gases.

In accordance with the invention, webs 24 are detachably connected between a pair of supports 26 protruding through refractory lining 12 and secured to the inner wall of kiln 10. In assembling the heat exchange structure, the radial webs are slid into the kiln between the supports and secured thereto by means of bolts 28 or the like passing through aligned apertures in the supports and the webs. The supports additionally position the radial webs in the correct location for assembly of the remaining portions of the heat exchange structure in the kiln.

Webs 24 terminate short of the radius of the cylinder and are interconnected by a plurality of thin, similar heat-conductive metal longitudinal webs 30, which extend along substantially the same length of the kiln as the radial webs. These webs 30 close off the inner radial ends of adjacent webs 24 to form the plurality of peripherally-spaced compartments 22 and to create a central opening 32.

Figure 3:
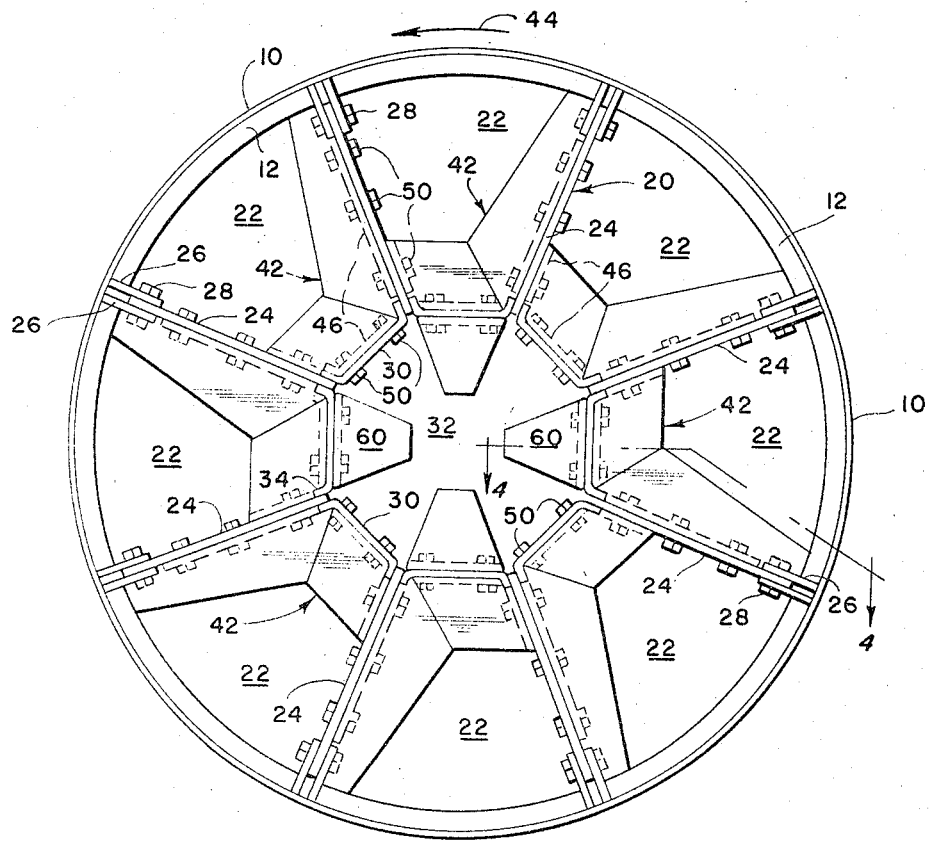
FIG. 3 is an enlarged end elevation as viewed from the line 3—3 of FIG. 1 showing the discharge end of the heat exchange structure.
Figure 4:
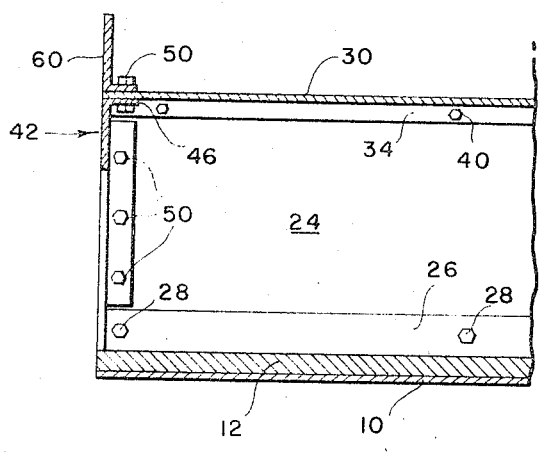
FIG. 4 is a sectional view taken along the line 4—4 of FIG. 3.

Longitudinal webs 30 include a radial flange 34 on either side adapted to lie flush against the radial webs 24, as shown in FIGS. 2 and 3, and have apertures aligned with similar apertures in the inner ends of radial webs 24. Bolts 40 or other suitable fastening means, quickly attachable, are inserted through these apertures to permit assembly and disassembly of the heat exchange structure both simply and quickly.

To further facilitate removal and replacement of the heat exchange structure, radial webs 24 and longitudinal webs 30 are each composed of a plurality of unit lengths, each having a length less than the length of the heat exchange structure. The unit lengths of the webs are assembled in abutting end relationship, as shown at 39 in FIG. 1, to form a continuous heat exchange structure. In a preferred embodiment of this invention the webs are about ten (10) feet in length and are secured to supports 28 approximately every five (5) feet.

In accordance with the invention and as can be noted from the drawings, removal of only a few bolts permits the removal of any one modular unit of the heat exchange structure without destroying the integrity or position of the remaining units of the structure. Removal of bolts 40, for example, and the sliding of a longitudinal web 30 radially outward and axially of the cylinder permits removal of the longitudinal web, while removal of bolts 28 and 40 permits removal of a radial web 24 by sliding it radially inward and axially of the cylinder. The novel design and structural combination of this invention thus permits rapid assembly and ease of replacement should any one unit of the heat exchange structure become damaged by continual exposure to the hot combustion gases or otherwise.

By providing an internal structure having a plurality of circumferentially-spaced chambers 22, the material can be subdivided and the amount of heat transferred to the material increased. There is increased exposure of the material to heat from the hot gases both directly by radiation and indirectly by conduction from the heated walls of the structure and the kiln. By locating chambers 22 circumferentially about central opening 32, which is also exposed to the flow of hot gases, and by constructing the walls of the chambers of relatively thin heat-conductive metal, maximum heat is transferred to the compartment walls by the hot gases flowing through the kiln. This heat in turn is transferred to the material as it passes over the heated walls thus providing maximum thermal efficiency for the kiln.

The interior sides of the walls of each compartment are heated by the flow of gas through that compartment, and the exterior walls are heated by the hot gases flowing through adjacent compartments and through the central opening. As heat is removed from the internal surfaces of the compartments by contact with the pulverulent material, the heat so removed is quickly replaced because of the highly conductive metal partitions of the heat exchange structure. A kiln having a high thermal efficiency is thus provided.

With the fundamentally simple construction of the heat exchange structure of the present invention, therefore, it is possible to achieve the high thermal efficiency provided by a metal heat exchange structure and at the same time increase the production and economic efficiency of the kiln over prior art devices that employ partitions of refractory material or permanent cooled metal partitions. In accordance with the objects of this invention, this increase in overall kiln efficiency is achieved by incorporating the advantageous features of heat conductive metal partitions in a heat exchange structure constructed of modular units which facilitate ease in replacement and repair of the structure.

Consonant with this invention, means are further provided across the discharge end of compartments 22 of heat exchange structure 20 to prevent the material from falling through the flow of hot gases, becoming entrained therein, and being carried out the upper end of the kiln, resulting in a loss of the material and requiring the use of a dust collection system to recover the entrained material.

As embodied and as shown in FIG. 3, this means comprises transverse deflectors, generally indicated at 42, also of heat-conductive metal, and detachably secured across the discharge end of each compartment 22. The deflectors 42 extend outwardly from longitudinal webs 30 and along the trailing radial web 24 of each compartment. With the cylinder rotating in the direction of arrow 44, transverse deflectors 42 permit the material to be discharged only while a compartment is travelling in the lower portion of its path and the material is against the lining of the kiln and not while a compartment is travelling in the upper portion, thereby preventing the material from falling across the stream of hot gases.

In accordance with the objects of this invention, to facilitate ease in construction and replacement, the transverse deflectors include flanges 46 having apertures aligned with similar apertures in the longitudinal webs and the radial webs permitting quick attachment, as by bolts 50 to the webs.

Further consonant with the invention and as shown in FIG. 3, heat vanes 60 are provided at the discharge end of the heat exchange structure. These heat vanes extend into central opening 32 and aid in the conduction of heat from the hot gases passing through this opening to the walls of compartments 22. In similar fashion to the other metal parts of the heat exchange structure, the heat vanes are detachably secured to the heat exchange structure—specifically to alternate longitudinal webs 30—by bolts 50.

In operation, the pulverulent material to be heated is fed into the forward end 18 of cylinder 10 and subdivided into a plurality of separate streams for passage through the separate compartments 22 of the inclined rotary kiln. In the embodiment shown, eight (8) compartments have been provided, but it is to be understood that a lesser or greater number of compartments can be used. As the material flows through the compartments, it is heated by direct contact with and by radiation from the hot gases flowing countercurrent to the flow of the material through each chamber and also by direct contact with the surfaces of each compartment, including the inner surface of the refractory lining of the cylinder, which surfaces have been similarly heated by contact with and radiation from the hot combustion gases.

In harmony with the objects of this invention, the plurality of angled, individual compartments, foster a thorough mixing of the mass of material within each chamber and increase the thermal efficiency of the kiln by exposing maximum amounts of the material to the heat transfer mediums. The angled compartments also prevent the material from sliding, without churning or tumbling, on the interface between it and the lining, as occurs in a single rotating chamber. This beneficial result of the invention thus ensures that different portions of the mass of material are exposed to the hot gases.

The heat-conductive metal partitions forming the plurality of compartments for the kiln greatly improve the heat transfer of the system, since the heat from the hot gases flowing through the central section can be quickly transferred to the inner surfaces of the compartments through longitudinal webs 30. Moreover, the hot gases supplied to adjacent chambers can be more quickly transferred through the metal heat-conductive radial webs 24 so that a more uniform and higher rate of heat transfer is achieved. The thin metal partitions are also desirable in that the cross-sectional area of the kiln through which the hot gases flow is only insignificantly decreased in comparison with the relatively large loss of cross-sectional area experienced when segmented sections consisting of refractory brick are used. The velocity of the hot combustion gases need be increased by only a relatively insignificant amount over that used with a single cylinder containing no heat exchange structure.

Radiation losses from hot gases through the cylinder walls is also greatly reduced because the area of the inner refractory lining of the shell receiving direct radiation from and contact with the hot gases in proportion to the area of other surfaces also receiving direct radiation from and contact with the hot gases is greatly reduced. This condition leads to improved conservation of heat as the gas flows through the cylinder. With this increased heat conservation, less fuel is needed and a greater production from the kiln can be achieved without increasing its length or the consumption of fuel. As much as 40% of the heat content in the hot gases is normally lost in an ordinary single chamber kiln since only a small portion comes into actual contact with the material.

As the material reaches the discharge end of the heat exchange structure, transverse deflectors 42 prevent the material from falling through the gas stream from the compartments in the upper portion of the cylinder and permit the material to be discharged only through the compartments in the lower portion of the cylinder. This minimizes the entrainment of the material in the gas and its consequent loss to the atmosphere or to a dust collection system as the hot gases flow out of the upper end of the kiln.

In kilns where the partitions forming the compartments of the heat exchange structure are constructed of refractory materials as a continuation of the interior walls of the cylinder or of specific metal structures permanently secured to the kiln, it is nearly impossible to remove individual sections of the heat exchange structure if there is damage to the structure or if there is an accumulation of material on the walls of the structure which reduces the thermal efficiency of the kiln. By constructing the heat exchange structure of readily detachable modular units, in accordance with this invention, individual parts of the structure can be quickly and easily removed, simply by loosening a few bolts without having to remove other units or without disturbing the integrity of the structure. In addition, the entire heat exchange structure can be slid axially out of the kiln in a simple and efficient manner if it is necessary to replace the entire structure.

This construction makes it economically feasible to use metal partitions in a rotary kiln suitable for the heat treatment of pulverized raw materials to produce cement clinker, for example, resulting in increased production and a reduction in cost of construction, operation, and maintenance of the kiln.

In accordance with its objects, to increase the economic, thermal, and production efficiencies of rotating kilns, the present invention thus provides an internal heat exchange structure for a kiln constructed of a plurality of thin metal heat-conductive modular units that permit a maximum amount of heat to be transferred from the hot gases passing through the kiln both directly and indirectly to the material to be heated, and that facilitate ease of construction, replacement, and repair of the heat exchange structure.

The invention in its broader aspects is not limited to the specific details shown and described but departures may be made from such details within the scope of the accompanying claims without departing from the principles of the invention and without sacrificing its chief advantages.

What is claimed is:

1. In a rotary kiln for heating pulverulent material comprising a refractory-lined cylindrical metal shell that rotates on an inclined axis and having an upper inlet end and a lower discharge end, a heat exchange structure disposed within the shell and comprising: a plurality of spaced heat-conductive metal radial webs; means for detachably securing the radial webs to the inner wall surface of the shell, said radial webs extending inwardly from the shell a distance less than the radius of the cylindrical shell and extending lengthwise along at least a portion of the length of the shell; a plurality of metal heat-conductive longitudinal webs, detachably interconnecting the inner radial end of each radial web and extending lengthwise along at least said portion of the length of the shell, said interconnected radial and longitudinal webs forming a plurality of peripherally spaced compartments about a central opening within the shell, whereby each of said compartments passes a portion of the pulverulent material with a stream of hot gases flowing through each compartment and also through the central opening in the shell in countercurrent flow to the passage of the pulverulent material.

2. The invention as defined in claim 1, in which the means for securing the radial webs to the shell includes a plurality of supports peripherally spaced about and secured at the inner surface of the shell with each of said radial webs being detachably secured to one of said supports.

3. The invention as defined in claim 2, wherein the supports comprise two longitudinally aligned bars for each radial web and in which each radial web is supported by a pair of said bars to permit the web to slide axially of the shell.

4. The invention as defined in claim 1, wherein each radial web and each longitudinal web is composed of a plurality of unit lengths that are secured in abutting end relationship to form the heat exchange structure.

5. The invention as defined in claim 1, which also includes a deflector means detachably secured to and extending radially outward from each longitudinal web substantially transverse to the axis of the shell and across a portion only of the discharge end of each compartment, whereby the material is prevented from falling across the stream of hot gases as it is discharged from the compartments and losses due to entrainment of the material in the stream are reduced.

6. The invention as defined in claim 5, in which the deflector means also extends radially outward along and forward from each radial web substantially transverse to the axis of the shell and across a portion only of the discharge end of each compartment.

7. The invention as defined in claim 1, which also includes heat vanes detachably secured to the longitudinal webs and protruding into but not fully covering the central opening in the shell.

8. In a rotary kiln for heating pulverulent material comprising a refractory-lined cylindrical metal shell that rotates on an inclined axis and having an upper inlet end and a lower discharge end, a heat exchange structure disposed within the shell and comprising: a plurality of slotted supports spaced about and secured at the inner peripheral surface of the shell; a plurality of heat-conductive metal radial webs slidably mounted in said slotted supports, means for releasably securing the radial webs in said supports, said radial webs extending inwardly a distance less than the radius of the shell and lengthwise along at least a portion of the length of said shell; a plurality of metal heat-conductive longitudinal webs detachably interconnecting the inner ends of the radial webs and extending along said portion of the length of the shell, said longitudinal webs having radial flanges that abut against the inner radial ends of adjacently spaced radial webs, said interconnected radial and longitudinal webs forming a plurality of peripherally spaced compartments about a central opening within the shell, whereby each of said compartments passes a portion of the pulverulent materials with a stream of hot gases flowing through each compartment and also through the central opening in the shell in countercurrent flow to the passage of the pulverulent material.

References Cited

UNITED STATES PATENTS

| 1,797,831 | 3/1931 | Luther | 263—32 |
| 2,249,087 | 7/1941 | Mueller | 263—32 |
| 2,786,666 | 3/1957 | Catlin | 263—32 |

FOREIGN PATENTS

| 818,320 | 8/1959 | Great Britain. |

JOHN J. CAMBY, *Primary Examiner.*